United States Patent [19]
Mendive

[11] Patent Number: 6,029,453
[45] Date of Patent: Feb. 29, 2000

[54] GEOTHERMAL MAGNETOHYDRODYNAMICS

[76] Inventor: David L. Mendive, 2705 Westview, Sparks, Nev. 89434

[21] Appl. No.: 09/126,968

[22] Filed: Jul. 31, 1998

[51] Int. Cl.$^7$ .................................................. F03G 7/00
[52] U.S. Cl. ................................ 60/641.2; 310/11
[58] Field of Search ........................... 310/11; 60/641.1, 60/641.2

[56] References Cited

U.S. PATENT DOCUMENTS 3,439,197 4/1969 Ohain et al. ......................... 310/11
5,582,011 12/1996 Bronicki et al. ..................... 60/641.5

*Primary Examiner*—Noah P. Kamen
*Attorney, Agent, or Firm*—Charles Hartman

[57] ABSTRACT

A method and an apparatus are disclosed which enable conversion of geothermal energy into electrical energy using the principles of magnetohydrodynamics (MHD). A hot, electrically conductive fluid produced from a geothermal resource either naturally or by artificial means, is passed under pressure through a suitable nozzle designed to increase the kinetic energy of the fluid, and then into a MHD duct where a portion of the kinetic energy is converted into electrical energy and extracted.

15 Claims, 5 Drawing Sheets

GEOTHERMAL MAGNETOHYDRODYNAMICS

FIELD OF THE INVENTION

This invention relates to the efficient extraction of energy from natural resources or, more specifically, the production of electricity directly from geothermal energy resources by method of the principles of magnetohydrodynamics (MHD).

BACKGROUND OF THE INVENTION

The natural heat of the earth is a vast energy resource estimated to be nearly 300 times larger than that obtainable from the combustion of all known reserves of fossil fuels combined. This resource, known as geothermal energy, flows as a continuous heat flux from the molten core through the mantle and crust to the surface of the earth. The temperature gradient of the geothermal heat flux averages 25° C. per kilometer of depth in the crust over most of the earth's surface. Higher gradients, e.g., 100° C./km, exist in parts of the world having geologically favorable structure and history. Still higher gradients are found in volcanic regions near tectonic boundaries.

Two principal methods are presently employed in conventional geothermal power generation. One method involves the use of natural steam obtained from a geothermal reservoir and expanded in steam turbines adapted from conventional technology for geothermal use. The other method involves the transfer of heat from the geothermal fluid to a working fluid, which is expanded in turbines made for use with the specific working fluid. The latter method is commonly referred to as a binary cycle, and is distinguished from the former method which is commonly referred to as a steam cycle. Combinations of the steam and binary cycles are sometimes employed to further utilize the available energy of the geothermal resource. Such plants are commonly referred to as geothermal combined cycle, or alternatively, as hybrid cycle power plants.

Steam for geothermal power generation may be produced directly, as is the case where the geothermal resource is manifested as a reservoir of dry steam, or it may be derived from a separation process where the reservoir is of the hot water, or hydrothermal, type. In hydrothermal reservoirs, a two-phase mixture of steam and hot water are generally produced from wells and then separated at the surface. The separated steam can be expanded in a steam turbine and the separated water can provide heat for a binary cycle power plant. Alternatively, a hydrothermal reservoir may be pumped in which case it is possible to bring pressurized hot water to the surface. The hot water can be used in a binary cycle or it may be flashed to produce steam for use in a steam cycle. A third type of geothermal resource, which is perhaps the most widespread but has not been developed commercially, is the hot dry rock which exists at some depth everywhere in the world. To extract heat from hot dry rock, a fluid must be circulated from the surface down to the rock formation and back again for the purpose of conveying the underground heat to the surface. Water is the fluid most commonly contemplated for such purposes, but other fluids with suitable properties might be used.

There have also been attempts to devise mechanical means to directly utilize the total flow of fluid from the geothermal reservoir without first resorting to a separation process or heat exchangers. These machines are designed to accept both the liquid and vapor fractions of a two-phase geothermal fluid, separate and expand them, and produce useful work in the process. Utilization of the total flow promises greater energy conversion, however, these machines have not proven commercially successful. Geothermal MHD generators are also total flow devices, but since they do not rely on moving parts in the geothermal process stream, they do not suffer the same disadvantages as do their mechanical counterparts.

Magnetohydrodynamic generators are similar to conventional generators in that a voltage is induced in a conductor as a result of the relative motion between the conductor and a magnetic field, in accordance with Faraday's Law. However, in a conventional generator the conductor is a solid metal such as copper, while in a MHD generator it is an electrically conductive fluid. MHD generators have been described using liquid metal, high temperature plasma, or even seawater as the electrically conductive fluid.

The electrical conductivity of the fluid is a key variable in the performance of MHD generators. The conductivity of fluids commonly considered varies over several orders of magnitude. The conductivity of seawater is approximately 4 Siemens per meter; seeded plasmas range from 1 to $10^4$ S/m; liquid metals range from $10^5$ to $10^7$ S/m. The conductivity of geothermal fluids also varies widely, ranging from $10^{-1}$ to $10^2$ S/m.

SUMMARY OF THE INVENTION

This invention provides a method and an apparatus for generating electricity from geothermal energy resources of any type.

A first aspect of this invention is a method of extracting usable energy from a geothermal resource. The method includes a number of sequential steps beginning with the production of hot, electrically conductive, geothermal fluids. The fluids are gathered and conveyed to a common point where they are accelerated through a nozzle and passed into a MHD duct where a portion of the kinetic energy of the fluid is converted and extracted as electrical energy. The fluids are then exhausted from the MHD duct into a diffuser before final disposition.

A second aspect of this invention is an apparatus to extract energy from a geothermal resource. The apparatus consists of one or more geothermal production wells; a system of pipelines, vessels, valves, and other method for the gathering and conveyance of geothermal fluids to a common point; a method such as a nozzle for accelerating the geothermal fluid; a MHD duct to convert and extract a portion of the kinetic energy of the geothermal fluid into electrical energy; and a diffuser to recover a portion of the kinetic energy of the fluid exhausted from the MHD duct.

In a geothermal MHD generator, the hot electrically conductive fluid may be obtained directly from a geothermal resource in certain embodiments, if the temperature, pressure, and conductivity permit such direct use. In other embodiments, one or more of the geothermal fluid characteristics may require enhancement in order to achieve efficient operation. For instance, if the temperature and pressure are sufficient to provide the motive power necessary but the electrical conductivity is low, conductivity enhancing additives, i.e., seed materials, may be introduced to improve the conductivity. The conductivity enhancing additives may include simple salts derived from or compatible with the natural geothermal fluid. Chemicals routinely injected downhole in production wells to control scale formation and corrosion may be adapted to serve the additional function of enhancing conductivity. Solid metal particles may be used or even liquid metal in a geothermally driven liquid metal MHD generator. In this embodiment, the geothermal fluid is used primarily for its motive power to accelerate a liquid metal, which serves as the electrically conductive fluid in the MHD generator.

The geothermal MHD generator is comprised of many of the same components found in MHD prior art, including a nozzle designed to increase the kinetic energy of the conducting fluid; a suitable magnetohydrodynamic duct where a portion of the fluid's kinetic energy is converted into electrical energy; and an electrical power conditioning and control system. The MHD duct is shaped in a fashion that optimizes conversion efficiency, given a particular set of resource characteristics and economic constraints. Both linear and disk-shaped configurations are contemplated. It will also include one or more electrode pairs for collection of the electric current, and an electromagnet to provide the requisite magnetic field. In many respects the duct will be similar to those described in the prior art, but specific improvements unique to geothermal applications will be incorporated.

One object of the invention is to encourage the utilization of geothermal resources regardless of composition, whether highly mineralized or of otherwise low quality, so that the use of fossil fuels can be somewhat reduced, along with the concomitant pollution and emission of greenhouse gases.

A further object is the application of the principles of magnetohydrodynamics for electric power generation, an art not yet in widespread commercial use, in part because of difficulties encountered with the high temperature plasmas and liquid metals that serve as the electrically conductive fluid in conventional MHD generators.

DESCRIPTION OF THE PREFERRED EMBODIMENTS

Figure 1:
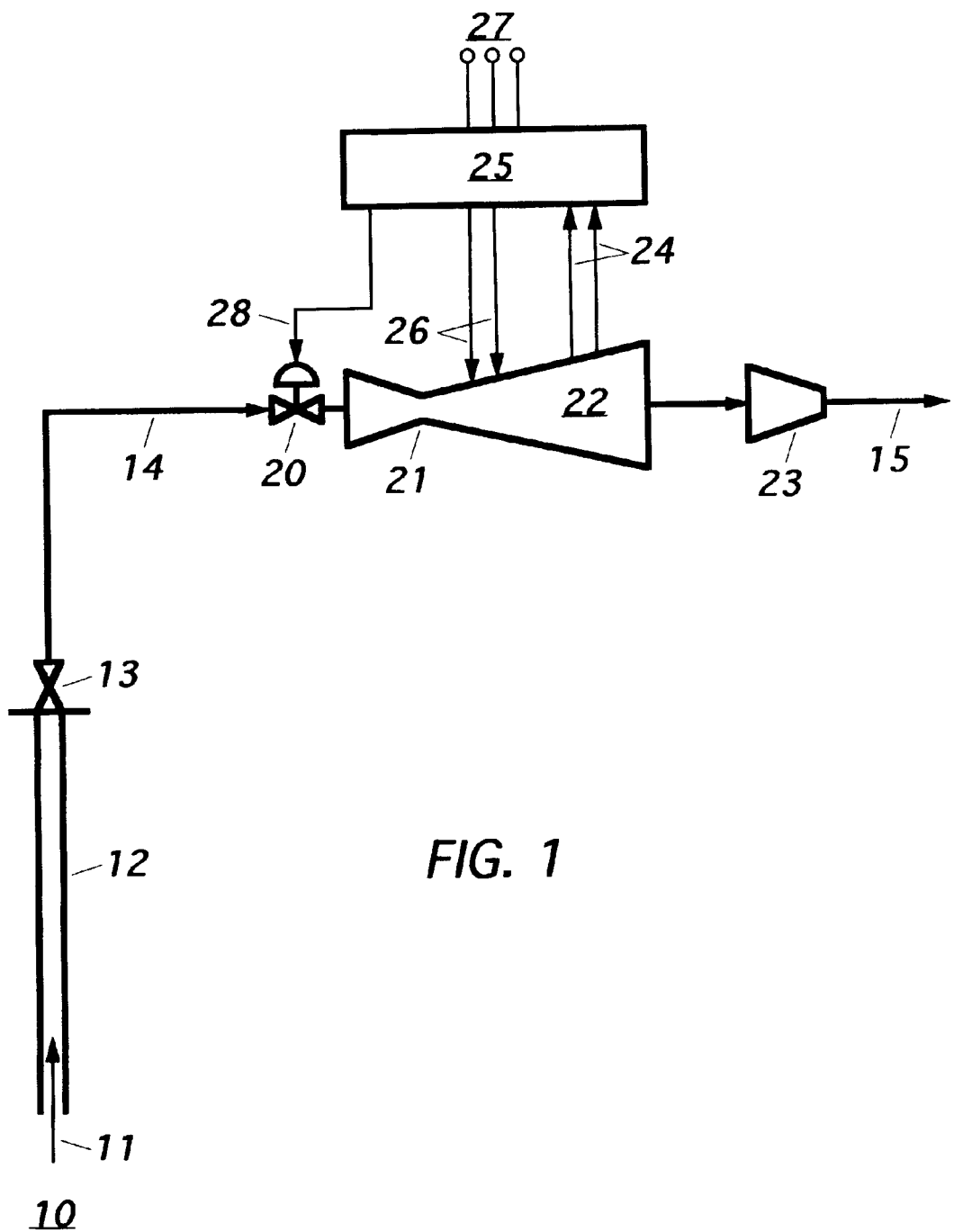
FIG. 1 is a schematic diagram of the simplest embodiment of the geothermal MHD generating system.

Referring to FIG. 1, the fundamental geothermal MHD generating system begins with a suitable geothermal resource 10, and one or more production wells 12, which allow fluids 11 heated by resource 10 to be raised from underground to the surface. Once above ground, the fluids pass through master valve 13 provided for the safe shutdown of the well. From the master valve, the fluids pass through suitable piping 14 to a throttling valve 20 where the fluid flow is controlled. From the throttling valve, the fluids pass through suitable piping to nozzle 21 where the fluid velocity is increased, resulting in an increase in kinetic energy at the expense of a pressure and enthalpy drop. From the nozzle, the high velocity fluids are directed through a suitably constructed MHD generating duct 22 where a portion of the kinetic energy of the fluid is converted into electrical energy and carried from the duct via electrical conductors 24 to power conditioner 25. A portion of the electrical output is returned to the MHD duct via conductors 26 to supply the magnetizing requirements of the duct. Another function of the power conditioner is to convert the direct current output of the MHD duct into alternating current in order that the electrical energy output 27 can be delivered to suitable loads or the nearest point of interconnection with an electric power transmission network. The power conditioner can also adjust the geothermal fluid flow rate via control signal 28 and/or the magnetic field strength of the MHD duct via conductors 26 so that the electrical output is optimally controlled.

A diffuser 23 can be applied to recover some of the pressure drop by reducing the kinetic energy of the spent fluid before further utilization or disposal. The spent geothermal fluid 15 must be disposed of in a sensible manner, depending on the nature of the fluid and site conditions. The remaining heat might also be utilized in appropriately cascaded applications before the fluids are returned to the reservoir.

Figure 2:
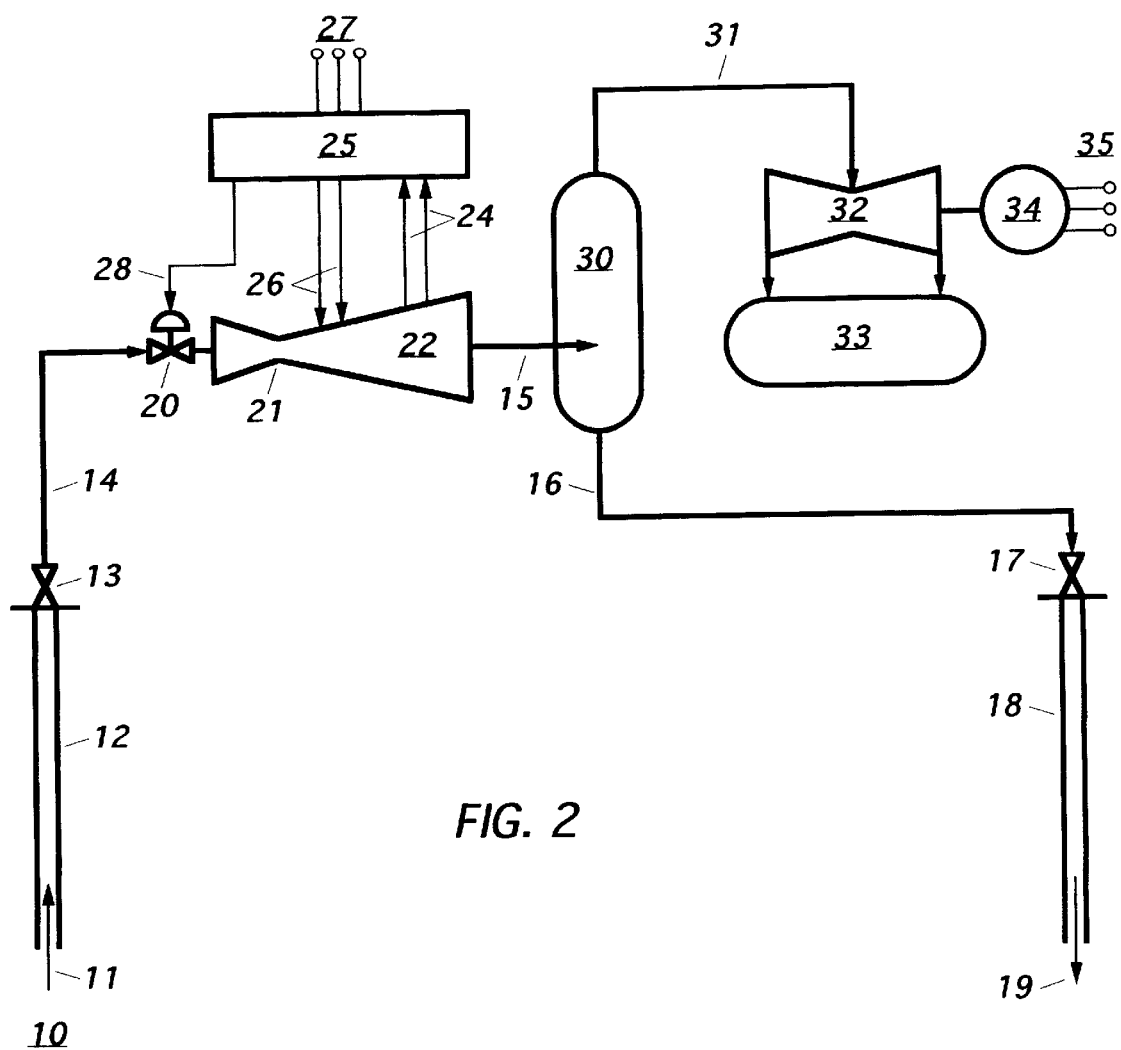
FIG. 2 is a schematic diagram of a geothermal MHD generator used in a geothermal power generation topping cycle.

Referring to FIG. 2, another embodiment of the invention is the use of the MHD generator in a geothermal topping cycle. In this instance, the geothermal fluids are directed first to a geothermal MHD generator, and then passed to a conventional geothermal power cycle for further extraction of energy. The conventional portion of the cycle may include a single flash steam cycle as shown in FIG. 2, or a dual flash steam cycle, or a steam and binary combined cycle, or yet other possibilities. In each case however, the geothermal MHD generator is the first to receive the geothermal fluid, hence the name geothermal MHD topping cycle.

In the arrangement of FIG. 2, the geothermal MHD generator exhausts into separator 30, which separates the vapor and liquid fractions. The vapor fraction 31 is conveyed to a steam turbine 32 where further work is done driving conventional generator 34 to produce electricity 35. The turbine exhaust is generally ducted to a condenser 33 where it is sub-cooled to form condensate. Not shown are the cooling and vacuum system components associated with a condensing steam cycle, nor the diffuser which might be used to recover some of the pressure drop before the MHD duct exhaust enters the separator. The liquid fraction 16 may then be returned to the geothermal reservoir directly, or additional energy may be extracted by incorporating further cycles. In the specific example of FIG. 2, the liquid fraction is conveyed to one or more injection wells 18 equipped with master valve 17. The injectate 19 reenters the reservoir with the intended result of prolonging the life of the resource.

Figure 3:
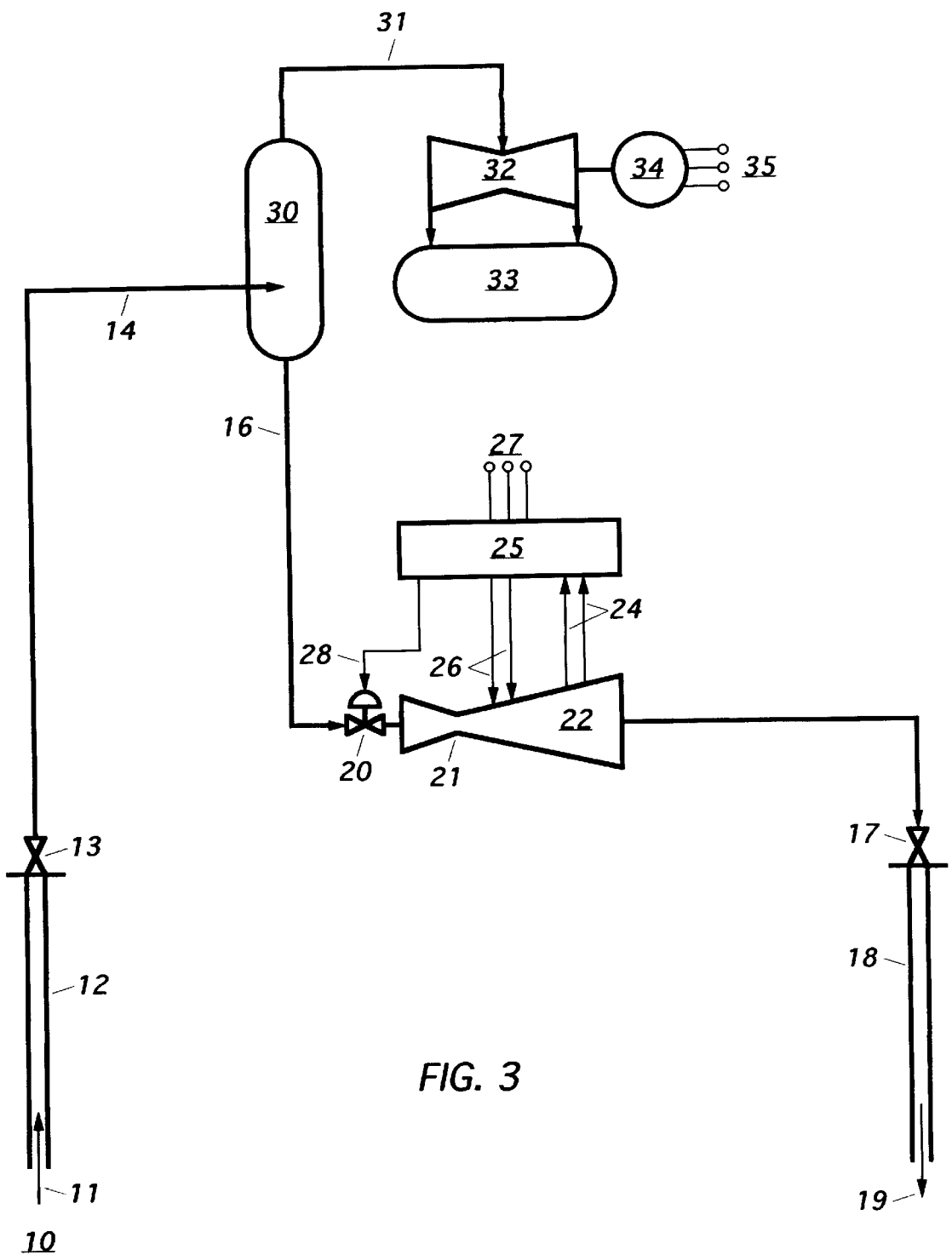
FIG. 3 is a schematic diagram of a geothermal MHD generator used in a geothermal power generation bottoming cycle.

Referring to FIG. 3, another embodiment of the invention is the use of the MHD generator in a geothermal bottoming cycle. Many of the existing geothermal power plants in operation today dispose of valuable geothermal fluids after use in the primary power generation process. These spent fluids contain significant energy that may be recovered in a secondary, or bottoming power generation process. Conventionally, the spent fluids are used in a binary cycle, or are flashed again to produce additional steam at lower pressure in a dual-flash geothermal steam cycle. In the present embodiment, a geothermal MHD generator receives the spent fluids to extract additional energy therefrom. In the specific example of FIG. 3, the geothermal MHD generator receives spent fluids in the form of a liquid fraction 16 produced by separator 30.

Figure 4:
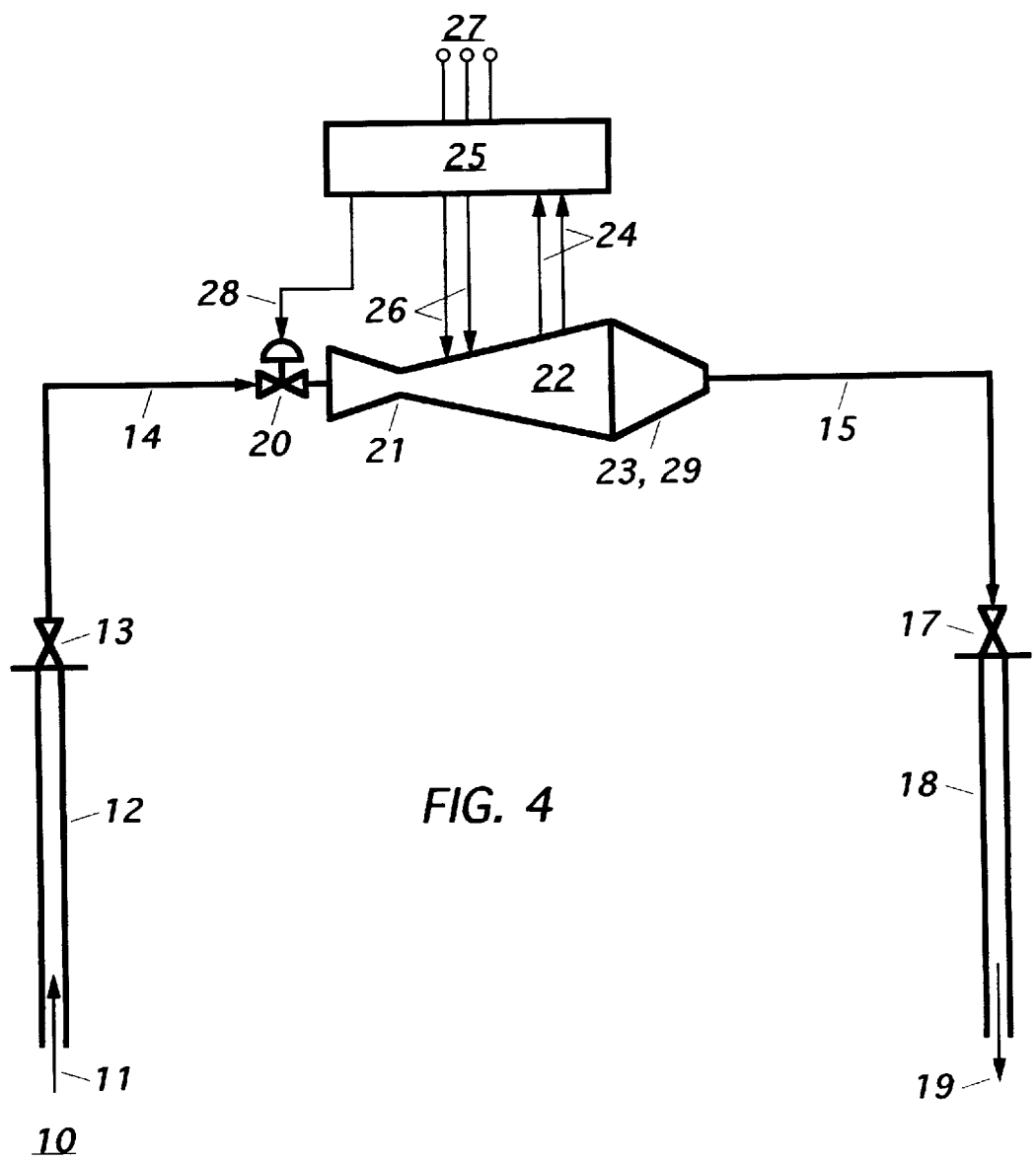
FIG. 4 is a schematic diagram of a geothermal MHD generating system incorporating a magnetohydrodynamic compressor/pump in tandem with a geothermal MHD generator.

Referring to FIG. 4, another embodiment of the invention incorporates a magnetohydrodynamic compressor/pump 29 in tandem with the MHD generator 22, and optional diffuser 23. Natural geothermal fluids contained dissolved gases, which once released from the liquid during the flashing process, are non-condensible under normal process temperatures and pressures. These non-condensible gases consist chiefly of $CO_2$, but may also contain traces of $H_2S$. Often these gases can be safely released into the atmosphere without exceeding air quality standards. However, the $H_2S$ content may be objectionable enough to require treatment or abatement in order to meet air quality standards. Furthermore, worldwide concern regarding greenhouse gases, including $CO_2$, provides new and additional motivation to further contain and even eliminate all gaseous emissions in the geothermal power generation process. To do so requires that the gases released in the flashing process be returned to the geothermal reservoir. Since the gases are non-condensible, either chemical or mechanical means are conventionally applied.

Chemical method may require expensive and troublesome process equipment, together with ongoing expenses for chemical reagents and disposal. Mechanical method include compressors which recompress the gases to elevate the pressure, thereby permitting the gas to reenter the liquid stream prior to injection back into the geothermal reservoir. When reservoir pressures are high, injection pumps must also be used to overcome reservoir pressures. In the current embodiment, a magnetohydrodynamic compressor/pump is used in place of mechanical compressors or pumps. The MHD compressor/pump can be separate from the MHD generator, or they may be integrally constructed, sharing even the same magnetic field source. A diffuser may be used after the MHD generator section to increase the pressure before the fluid enters the MHD compressor/pump.

Figure 5:
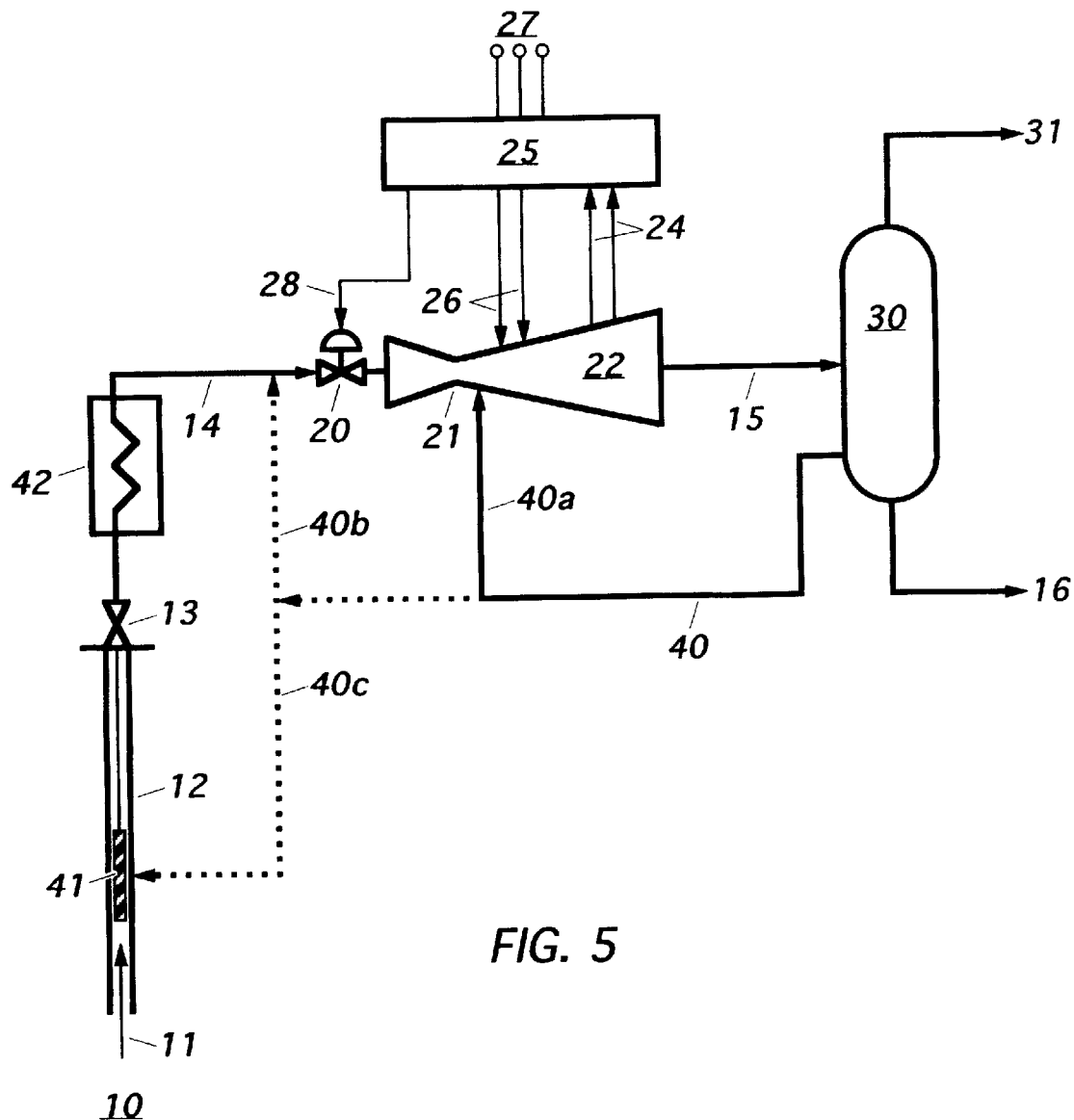
FIG. 5 is a schematic diagram of a geothermal MHD generating system incorporating features for recycling conductivity enhancement material.

Referring to FIG. 5, another embodiment of the invention incorporates a system for recycling conductivity enhancement or seed material. The seed may be injected into the geothermal fluid between nozzle 21 and the MHD duct 22 as indicated by line 40a. Alternatively, the seed may be injected at a suitable point in the geothermal fluid gathering system 14 as indicated by line 40b. Yet another option is to inject seed material downhole in the production well(s) 12, as indicated by line 40c. In each case, the seed material mixes with the geothermal fluid to increase the electrical conductivity of the fluid before entering the MHD duct. The fluid exhausted from the duct then contains valuable seed that may be collected and separated. In the arrangement of FIG. 5, vessel 30 is a multipurpose separator, serving to recover the seed material 40 as well as separating the liquid and vapor fractions of the geothermal fluid, 16 and 31 respectively. Yet another embodiment of the invention may employ a pump 41 to increase the pressure of the geothermal fluid. A heater 42 may also be included to increase its temperature. Other pumps, valves, controls, instuments and other accessories that are conventionally found at a geothermal site are not shown in the figure. which may be used in the process.

This invention has been described with reference to specific examples and particular preferred embodiments thereof. It should be understood that modifications, variations, and alterations may be made in certain instances. For example, the geothermal resource as it occurs naturally may not be ideally suited for efficient generation without some preconditioning such as increasing the pressure, temperature, or conductivity. In some installations, the magnetic field may be produced with normal electromagnetic means, while in others, superconducting electromagnetic coils may be used. It may be desirable or necessary to treat the duct exhaust to collect the conductivity enhancement material and/or minerals contained in the geothermal fluid. Such modifications, variations, and alterations will be readily apparent to those skilled in the art. The appended claims are intended to encompass all such modifications, variations, and alterations.

I claim:

1. A method of producing electricity from a geothermal resource comprising obtaining a fluid having at least some kinetic energy from the geothermal resource; and passing the fluid through a magnetohydrodynamic duct to convert at least a portion of the kinetic energy to electrical energy.

2. The method of claim 1 further comprising the process of accelerating the geothermal fluid to increase the kinetic energy of the fluid.

3. The method of claim 1 further comprising the process of seeding the geothermal fluid to increase the electrical conductivity of the fluid, together with the optional process of recovering and recycling the seed material.

4. The method of claim 1 further comprising the process of pumping the geothermal fluid to increase its pressure.

5. The method of claim 1 further comprising the process of heating to the geothermal fluid to increase its temperature.

6. The method of claim 1 further comprising the geothermal magnetohydrodynamic generator employed in a topping configuration with conventional geothermal electric generating means.

7. The method of claim 1 further comprising the geothermal magnetohydrodynamic generator employed in a bottoming configuration with conventional geothermal electric generating means.

8. The method of claim 1 further comprising the geothermal magnetohydrodynamic generator employed in tandem with a geothermal magnetohydrodynamic compressor/pump.

9. An apparatus to produce electricity from geothermal resources of any type, comprising;

an inlet or entrance to accept and contain geothermal fluids conveyed to the apparatus;

a nozzle or other accelerating means in fluid communication with the inlet, to increase the velocity and kinetic energy of the geothermal fluid;

a magnetohydrodynamic duct in fluid communication with the nozzle outlet, to convert a portion of the kinetic energy of the geothermal fluid into electrical energy for extraction;

and an outlet or exit to discharge geothermal fluids for conveyance away from the apparatus.

10. The apparatus of claim 9 further comprising a diffuser or other decelerating means in fluid communication with the magnetohydrodynamic duct outlet, to decrease the velocity and increase the pressure of the geothermal fluid.

11. The apparatus of claim 9 further comprising a geothermal fluid conductivity enhancement means, together with the optional apparatus to recover and recycle the fluid conductivity enhancement seed material.

12. The apparatus of claim 9 further comprising a geothermal fluid pressurization means.

13. The apparatus of claim 9 further comprising a geothermal fluid heating means.

14. The apparatus of claim 9 further comprising a geothermal fluid production means.

15. The apparatus of claim 9 further comprising a geothermal fluid disposal means.

* * * * *